United States Patent [19]

Ikeda

[11] Patent Number: 4,663,640

[45] Date of Patent: May 5, 1987

[54] RECORDING HEAD

[75] Inventor: Masami Ikeda, Tokyo, Japan

[73] Assignee: Canon Kabushiki Kaisha, Tokyo, Japan

[21] Appl. No.: 755,341

[22] Filed: Jul. 16, 1985

[30] Foreign Application Priority Data

Jul. 20, 1984 [JP] Japan .............................. 59-150652
Jul. 23, 1984 [JP] Japan .............................. 59-152361

[51] Int. Cl.[4] ....................... G01D 15/18; H05B 1/00

[52] U.S. Cl. ........................... 346/140 R; 346/76 PH; 219/216

[58] Field of Search ...................... 346/76 PH, 140 R; 219/216

[56] References Cited

U.S. PATENT DOCUMENTS 4,035,607 7/1977 Wu ...................................... 219/216
4,168,343 9/1979 Arai et al. ......................... 428/426 X
4,345,262 8/1982 Shirato et al. .................. 346/140 R
4,450,457 5/1984 Miyachi et al. ................. 346/140 R

OTHER PUBLICATIONS

Condensed Chemical Dictionary, G. Hawley, 9th Ed., 1977, pp. 161, 162, 267, 344.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A recording head comprises at least a substrate, a lower layer provided on said substrate, a heat-generating resistance layer provided on said lower layer and at least a pair of opposed electrodes connected electrically to said heat-generating resistance layer, and said lower layer is constituted of a layer comprising carbon thin film having a diamond matrix structure or comprising carbon fine crystals having a diamond matrix structure. The recording head can be used as a liquid jet recording head.

16 Claims, 12 Drawing Figures

RECORDING HEAD

BACKGROUND OF THE INVENTION

1. Field of the Invention

This invention relates to a recording head which performs recording through utilization of heat energy.

2. Description of the Prior Art

Recording methods for performing recording by utilization of heat energy have heretofore been attracting attention for generating very low noise during recording because of non-impact and also for their application to color printing which has been developed in recent years. The recording head to be used in a thermal printer having such a thermal recording method has generally a constitution comprising a glaze layer having smoothness, which is an electrical insulator and also functions as the upper layer for controlling the accumulation of the heat generated, provided on a substrate of a good thermal conductor such as alumina ceramics, a heat-generating resistor on said substrate and a pair of electrodes connected electrically to the heat-generating resistor, in at least a part thereof. According to information to be recorded, electrical signals are inputted into the above heat-generating resistor, whereby heat energy is generated from the heat-generating resistor and recording is effected by utilization of this heat energy.

In a recording head for performing recording by use of heat energy as employed in a thermal printer, as the lower layer provided on the substrate, glass, quartz, etc. comprising $SiO_2$ as the main component has been employed in the prior art.

Also, other than the thermal printer as mentioned above, the ink jet recording method (liquid jet recording method) known as a non-impact system recording method is also recently attracting attention in that generation of noise during recording is negligibly small, that high speed recording is possible and also that recording can be effected on the so called plain paper without special treatment of fixing.

Among them, for example, liquid jet recording methods as disclosed in Japanese Laid-open Patent Publication No. 51837/1979 and German OLS No. 2843064 have a different specific feature from those of other liquid jet recording methods in that driving force for discharging droplets is obtained by permitting the heat energy to act on liquid.

More particularly, the liquid jet recording method disclosed in German OLS No. 2843064 is not only applicable for the so called drop-on demand recording method, but also has the specific feature of being capable of providing images of high resolution and high quality at high speed, because the recording head portion can easily be embodied into a recording head of the full line type and high density multi-orifice.

The recording head portion in the device to be applied for the above liquid jet recording method is provided with an orifice for discharging liquid, a liquid discharging portion connected to said orifice having a heat-acting portion which is the portion where heat energy acts on the liquid for discharging droplets and an electrothermal transducer as a means for generating heat energy.

The electrothermal transducer is provided with a pair of electrodes and a heat-generating resistance layer connected to these electrodes having a region for heat generation (heat-generating portion) between these electrodes.

A typical example showing the structure of such a recording head to be used for the liquid jet recording method is shown in FIG. 1A and FIG. 1B.

FIG. 1A is a partial front view as viewed from the orifice side of a recording head to be used for the liquid jet recording method according to the present invention, and FIG. 1B is as partial sectional view taken along the dot and dash line XY as shown in FIG. 1A.

The recording head 101 shown in the Figures has a structure having an orifice 105 and a liquid discharging portion 106 formed by bonding a grooved plate 104 provided with a desired number of grooves with a certain width and a depth at predetermined line density to the substrate 103 on which an electrothermal transducer 102 is provided so as to cover over the surface of said substrate. In the case of the recording head shown in the Figures, it is shown to have a plurality of orifices 105. However, the present invention is not, of course, limited to such an embodiment, but a recording head in the case of a single orifice is also included within the scope of the present invention. The liquid discharging portion 106 has an orifice 105 for discharging liquid at its terminal end and a heat-acting portion 107 which is the site where the heat energy generated from the electrothermal transducer acts on liquid to generate bubbles, thereby causing abrupt changes in state through expansion and shrinkage of its volume.

The heat-acting portion 107 is positioned above the heat-generating portion 108 of the electrothermal transducer 102, with the heat-acting face 109 as the face which comes into contact with liquid being the bottom face.

The heat-generating portion 108 is constituted of a lower layer 110 provided on the substrate 103, a heat-generating resistance layer 111 provided on said lower layer and an upper layer 112 provided on said heat-generating layer 111. The heat-generating layer 111 is provided on its surface with electrodes 113 and 114 for passing current through said layer 111 for geneartion of heat. The electrode 113 is the electrode common to the heat-genearting portions of respective liquid discharging portions, and the electrode 114 is a selection electrode for generating heat by selecting the heat-generating portion of the each liquid discharging portion and provided along the liquid channel of the liquid discharging portion.

The upper layer 112 serves to protect the heat-generating resistance layer 111, that is, for protecting chemically and physically the heat-generating resistance layer in the heat-generating portion from the liquid employed the upper layer 112 separates the heat-generating resistance layer 111 from the liquid filling the channels in the liquid discharging portion 106 and also prevents the electrodes 113 and 114 from short circuit through the liquid.

The upper layer 112 also serves to prevent electrical leak between adjacent electrodes. Particularly, it prevents electrical leak between the respective selection electrodes or it prevents electrical corrosion caused by the contact between the electrode beneath each liquid channel with liquid which may occur for some reason and current passage through such contact is important. For this purpose, the upper layer 112 having such a function of protective layer is provided at least on the electrode beneath the liquid channel.

Further, the liquid channel provided at each liquid discharging portion is connected through the common liquid chamber constituting a part of the liquid channel upstream of each liquid discharging portion, and the electrodes connected to the electrothermal transducer provided at each liquid discharging portion are provided, for the convenience of designing thereof, so as to pass below said common liquid chamber on the upstream side of the heat-acting portion.

Accordingly, also at this portion, the above-mentioned upper layer is generally provided for the purpose of preventing contact between the electrodes and the liquid.

Whereas, as the characteristics required for the lower layer of a thermal head or the lower layer of a liquid jet recording head, the following characteristics are primarily important:

a. to have good heat resistance which can stand the heat generated at the heat-generating portion of the heat-generating resistance layer;

b. to have good thermal impact resistance which can stand repeated heat generation at the heat-generating portion of the heat-generating resistance layer;

c. to have a coefficient of thermal expansion substantially equal to that of the heat-generating resistance layer and that of the electrode layer laminated on the lower layer;

d. to have good adhesion to the respective layers laminated on the lower layer.

When these characteristics are fully satisfied, the recording head has a long life and high reliability. In addition, from the viewpoint of preparation of the recording head, in formation of the heat-generating resistance layer to a desired shape which is generally done according to the photolithographic step, if the etching speed ratio of the lower layer to the heat-generating resistance layer is not sufficiently great, there is also involved the problem such that an unnecessary portion of the lower layer may be etched or side etching may occur to lower the life of the completed head. Thus, the lower layer is required to have great etching resistance as one of the important charactcristics.

Another important role of the lower layer is control of the heat generated from the heat-generating resistance layer. During recording, it is required to transmit necessary and sufficient heat toward the liquid side and also to permit unnecessary heat to be dissipated rapidly toward the substrate side. If this control of heat cannot be done well, there may be caused bad influences such as worsening of response to input of electrical signals to the electrothermal transducer or destruction of members constituting the recording head such as the electrothermal transducer, etc. through accumulation of heat. Particularly, in recent years, a recording head with high response characteristic is highly desired, because tone recording characteristic and high speed recording performance are demanded. For satisfying such requirements, the substrate constituting the recording head is desired to be made of a material having excellent heat dissipating characteristic and heat accumulating characteristic. Further, for permitting a substrate having such characteristics to function fully effectively, the lower layer is required to be formed of a material having high thermal conductivity.

However, no lower layer which can satisfy all of the requirements as mentioned above has been proposed yet. For example, in the case of a glaze layer preferably employed for a thermal head, since the heat resistance is to a temperature of about 500° C. to 800° C., the temperature which can be reached by the heat energy generated by the heat-generating resistance layer will be suppressed in the vicinity of such a temperature. In the case of performing recording at temperatures higher than the above temperature, it has been required to provide a layer having high heat resistance on the lower layer or devise the method for driving the electrothermal transducer.

On the other hand, in aspect of etching resistance, since the lower layer has an etching resistance on the same level as or lower than that of the heat-generating resistance layer, it may sometimes lower the yield in etching process or the reliability of the recording head. For this reason, side etch has been prevented in the prior art by a contrivance such as providing further an etching resistant layer such as of $Ta_2O_5$, etc. excellent in etching resistance on the glaze layer, thereby preventing lowering in reliability of the recording head. In addition, also in aspect of thermal impact resistance, the glaze layer composed mainly of glass involves the problem of generation of cracks, etc., and also has the problem of very poor adhesion to the heat-generating resistance layer and the electrode layer because of the coefficient of thermal expansion which is greatly different from that of each of such layers (composed mainly of metals).

Also in aspect of thermal conductivity, there has been involved the problem that the temperature of The glaze layer itself of the prior art is elevated during high speed recording, whereby response characteristic of the recording head was worsened to worsen the quality of recording.

Further, in the heat-oxidized $SiO_2$ of Si which has been known to be preferably used for the lower layer in the liquid jet recording head, etching resistance, particularly thermal expansion ratio and thermal conductivity as the lower layer for the liquid jet recording head also suitable for high speed recording could not fully be satisfactory in some cases. Thus, no bubble jet recording head excellent in overall use durability when performing high speed recording continuously for a long time has been provided.

SUMMARY OF THE INVENTION

The present invention has been accomplished in view of the problems of the prior art as described above, and it is intended to provide a recording head which is long in life with extremely high reliability and also good in high speed response.

Another object of the present invention is to provide a recording head which is highly reliable in production working and high in yield in the production steps.

A further object of the present invention is to provide a recording head having a lower layer satisfying the requisite characteristics as described above formed on a substrate.

Still another object of the present invention is to provide a recording head having a lower layer of a material which is excellent in heat resistance, thermal impact resistance, etching resistance and adhesion to respective layers provided on the lower layer, and also high in thermal conductivity.

A still further object of the present invention is to provide a recording head which is high in production yield and high in reliability without variance in jetting characteristic of liquid even when it is made to have a multi-orifice.

According to one aspect of the present invention, there is provided a recording head which comprises at least a substrate, a lower layer provided on said substrate, a heat-generating resistance layer provided on said lower layer and at least a pair of opposed electrodes connected electrically to said heat-generating resistance layer, said lower layer being constituted of a layer comprising carbon or comprising carbon as the matrix.

According to another aspect of the present invention, there is provided a liquid jet recording head which comprises a liquid discharging section having an orifice for discharging liquid to form flying droplets and a heat acting section which is the part where the heat energy for formation of said droplets acts on the liquid, and an electrothermal transducer having a lower layer provided on a substrate, a heat-generating resistance layer provided on said lower layer and at least one pair of opposed electrodes connected electrically to the heat-generating resistance layer to form a heat-generating section between these electrodes, said lower layer being constituted of a layer comprising carbon or comprising carbon as the matrix.

DESCRIPTION OF THE PREFERRED EMBODIMENTS

Figure 1A:
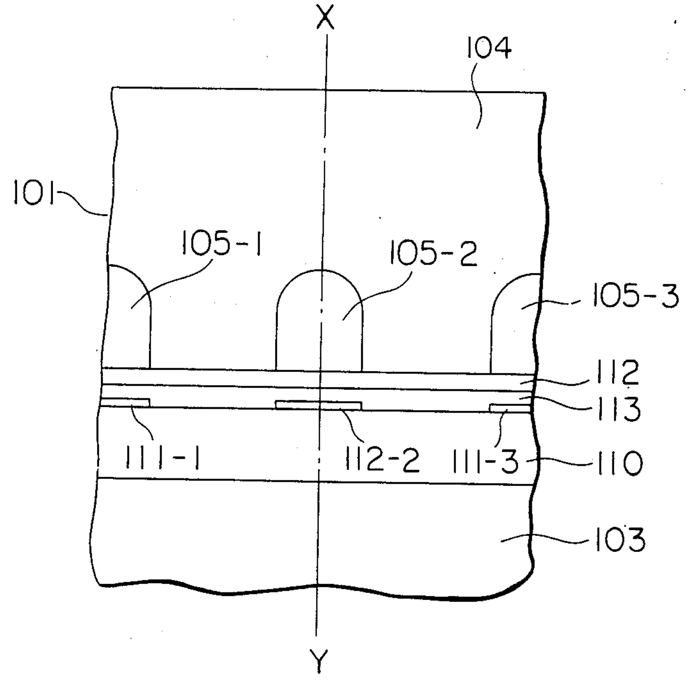
FIG. 1A PRIOR ART
FIG. 1A is a schematic partial front view for illustration of the recording head to be used in the liquid jet recording method according to the present invention, and FIG. 1B a schematic partial sectional view taken along the dot and dash XY shown in FIG. 1A.

The present invention is described below by referring to the drawings.

Figure 2:
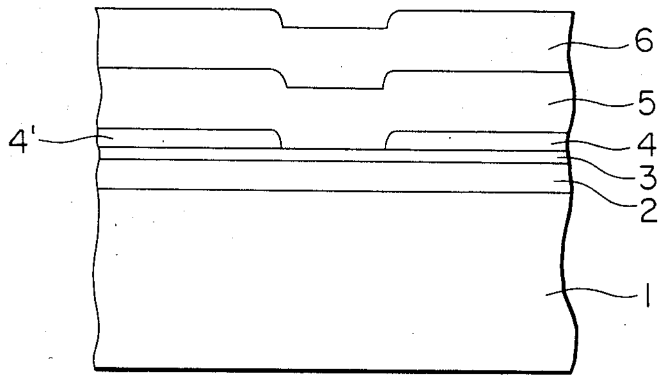
FIG. 2 is a schematic sectional view for illustration of the recording head of the present invention.

FIG. 2 is a schematic sectional view for illustration of the recording head of the present invention, and a thermal head is shown as an example in FIG. 2.

In FIG. 2, 1 is a substrate, 2 a lower layer, 3 a heat-generating resistance layer, 4 electrodes, 5 an oxidation resistant layer and 6 an abrasion resistant layer.

The substrate 1 constitutes the base plate of the recording head, and silicon, ceramics, glass metal, etc. may be employed as the material therefor, but any of most materials having good dissipation of heat may be available. The lower layer 2 is provided on the substrate 1, plays a role as the cushioning material for heat generated at the heat-generating resistance layer and also has the function to enhance heat efficiency. As the material constituting said layer 2 having the requisite characteristics as mentioned above, a layer comprising carbon or a material comprising carbon as the matrix is used in the present invention, said material being made to have a content of carbon atoms of 90 atomic % or more. Said layer 2 should more preferably have characteristics resembling those of a diamond and may be formed on a substrate according to the CVD method, the plasma CVD method, the ionization vapor deposition method, etc. As the reactive gases to be used for formation of the layer 2, there may be employed gases containing carbon atoms, more preferably hydrocarbon gases, specifically $CH_4$ gas or $C_2H_6$ gas as preferable ones. Also, it is possible to use a gas in which hydrogen gas is mixed with the above gases. The pressure in the chamber during layer formation, which may differ depending on the layer formation method employed, may generally be preferred to be $10^{-2}$ to $10^3$ Pa, more preferably $10^{-2}$ to $10^2$ Pa, with the substrate temperature being preferably within the range of from room temperature to about 1000° C. The lower layer 2 of the present invention may optimally be made a layer containing a thin film having a diamond structure or microcrystals having diamond structure.

The lower layer 2 may have a layer thickness preferably of 1 μm to 50 μm, more preferably 1 μm to 30 μm, optimally 5 μm to 30 μm, for accomplishing the requisite characteristics as mentioned above. The resistance value of the lower layer 2 should desirably be greater than the resistance value of the heat-generating resistance layer provided later.

The heat-generating resistance layer 3 generates Joule's heat by the power supplied from the electrodes 4, thereby generating the heat energy for recording. As the material constituting the layer 3, there may be employed borides such as $HfB_2$, $ZrB_2$, etc., nitrides such as $Ta_2N$, TiN, etc., carbides such as TaC, TiC, etc., high melting metals such as Ta, W, Hf, Mo, etc., or thermite which is a mixture of these metals with oxides. The electrodes layer 4 may be constituted generally of a metallic material such as Au, Cu, Al, Ag, Ni, etc. and other materials than metallic materials may also be available, provided that they are conductors good enough to supply power efficiently.

The oxidation resistant layer 5 prevents oxidation of the above heat-generating resistance layer 3, and is provided for elongating the life of the electrothermal transducer. The oxidation resistant layer 5 should desirably be constituted of a material which is enriched in heat resistance and low in oxygen permeability such as $SiO_2$, etc., and also higher in electrical resistance than the material constituting the heat-generating resistance layer 3.

The abrasion resistant layer 6 is provided for protection of the recording head from abrasion by contact between the recording head and the material for recording (recording medium or heat transfer ribbon, etc.). The material for forming the abrasion resistant layer 6 is required to be enriched in abrasion resistance such as $Ta_2O_5$, etc. It is not necessarily required to provide the oxidation resistant layer 5 and the abrasion resistant layer 6, when the heat generating layer 3 and the electrodes 4 are formed of materials enriched in oxidation resistance and abrasion resistance. However, the oxidation resistance layer 5 and the abrasion resistance layer 6, in order to enhance response characteristic to the signal input of the recording head in addition to satisfying the characteristics as mentioned above, should desirably be formed of a material having high thermal conductivity, and its thickness should desirably be made as small as possible.

The layer provided on the electrothermal transducer comprising the heat-generating resistance layer 3 and the electrodes 4 is not of course limited to the constitution as shown in FIG. 2.

The lower layer 2 may be provided at least in the heat-generating portion of the electrothermal transducer, namely at the heat-generating resistance layer portion between a pair of opposed conductive layers connected to the heat-generating resistance layer.

Figure 3:
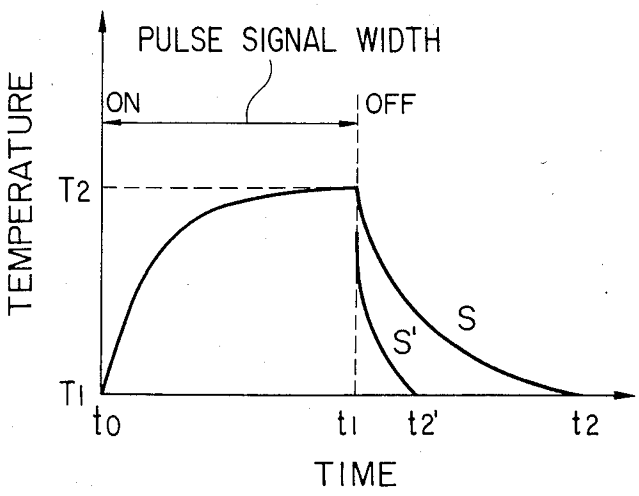
FIG. 3 shows the temperature change with time at the heat-generating section of the electrothermal transducer.

Next, the temperature change with time at the heat-generating portion of the electrothermal transducer on the substrate during high frequency recording is to be described in FIG. 3.

As shown in FIG. 3, the heat response characteristic of the recording head is determined by the time $t_2-t_1$ during which the temperature $T_2$ at the time $t_1$ is restored to the initial temperature $T_1$ at the time $t_2$, when the pulse width of the electrical pulse signal is made W. Accordingly, the heat response characteristic is better as the time to the time $t_2-t_1$ is shorter.

In short, in FIG. 3, in the case shown by the curve S, unless the input of the next pulse signal is initiated at the point later than the time $t_2$, the substrate temperature will gradually be elevated, recording is effected with dot diameters greater than necessary or the so called trailing to effect recording also at the portion where no recording signal is inputted may be caused, whereby recording quality is deteriorated. For this reason, for performing high frequency recording, it is necessary to make a design of thermal characteristics of the recording head according to the curve S′ as shown in FIG. 3.

Alumina ceramics generally employed in the prior art preferably as the substrate have a thermal conductivity which is about 20-fold higher as compared with the thermal conductivity of glass (0.0092 W/cm.deg). Accordingly, accumulated heat generated during recording is mostly generated through the heat resistance of the glass which is the glaze layer generally employed as the lower layer. For example, when recording is effected on a base plate having 30 $\mu$m of a glaze layer on alumina ceramics substrate at a pulse width of $W=1$ ms, the intermission time for pulse signal input is required to be about 3 ms.

In contrast, in the recording head employing the lower layer comprising a carbon thin film of the present invention, due to the thermal conductivity far greater than that of the glaze layer of the prior art, the next pulse can be inputted even after an intermission time of about 0.5 ms or less when the pulse signal is inputted under the same conditions as in the prior art. Therefore, a recording head very suitable for high speed recording is provided by the present invention.

Figure 4:
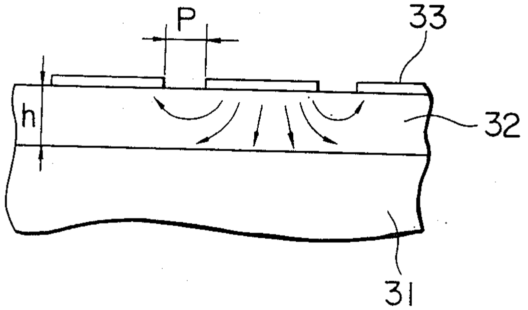
FIG. 4 is a schematic sectional view of the heat-generating section of the electrothermal transducer.
Figure 5:
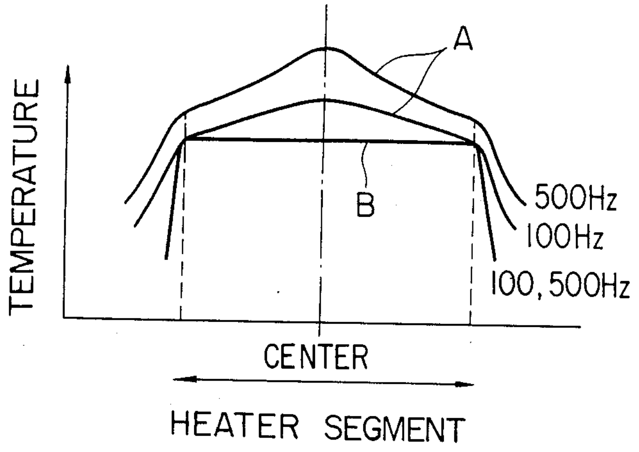
FIG. 5 shows the temperature distribution in the recording head of long length.

Next, mutual thermal influences between the electrothermal transducer provided adjacent to each other are briefly described. In the schematic sectional view of the heat-generating portion of the electrothermal transducers of the recording head in FIG. 4, 31 is a substrate, 32 an upper layer, 33 a heat-generating resistance layer, and the arrowheads in the figure shows schematically the conduction of heat from one segment. As shown in FIG. 4, as the pitch P between the patterns becomes smaller relative to the layer thickness h of the upper layer, mutual interference of heat between the adjacent segments poses a problem. Particularly, in a recording head of long length of the full-line type, the temperature is different between the center portion and both ends portions of the head as shown in FIG. 5, and the temperature distribution as shown by the curve A has been created in the recording head of the prior art. When such a temperature distribution is created, variance will frequently occur in the record density, whereby uniform and high quality recording can be effected with difficulty.

In contrast, in the case of the recording head of the present invention, due to thermally excellent characteristics, the temperature distribution of the recording head becomes as shown by the curve B. In other words, the respective segments have substantially the same temperature over the entire width of the head. Besides, in the present invention, since no substantial change in temperature distribution occurs even when the driving frequency may be changed, stable recording of images can be effected without dependence on the driving conditions, thus providing a recording head which can perform continuous recording of high image quality.

Figure 1B:
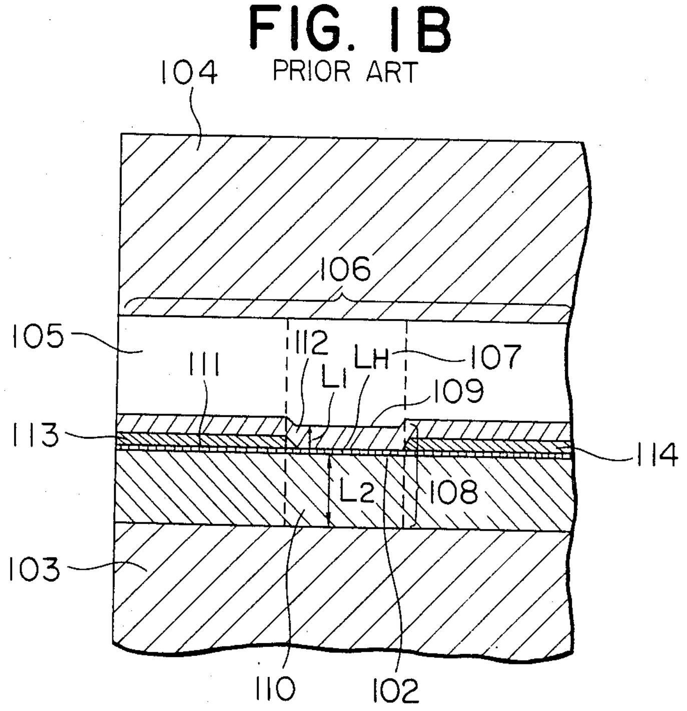
FIG. 1B PRIOR ART
Figure 6A:
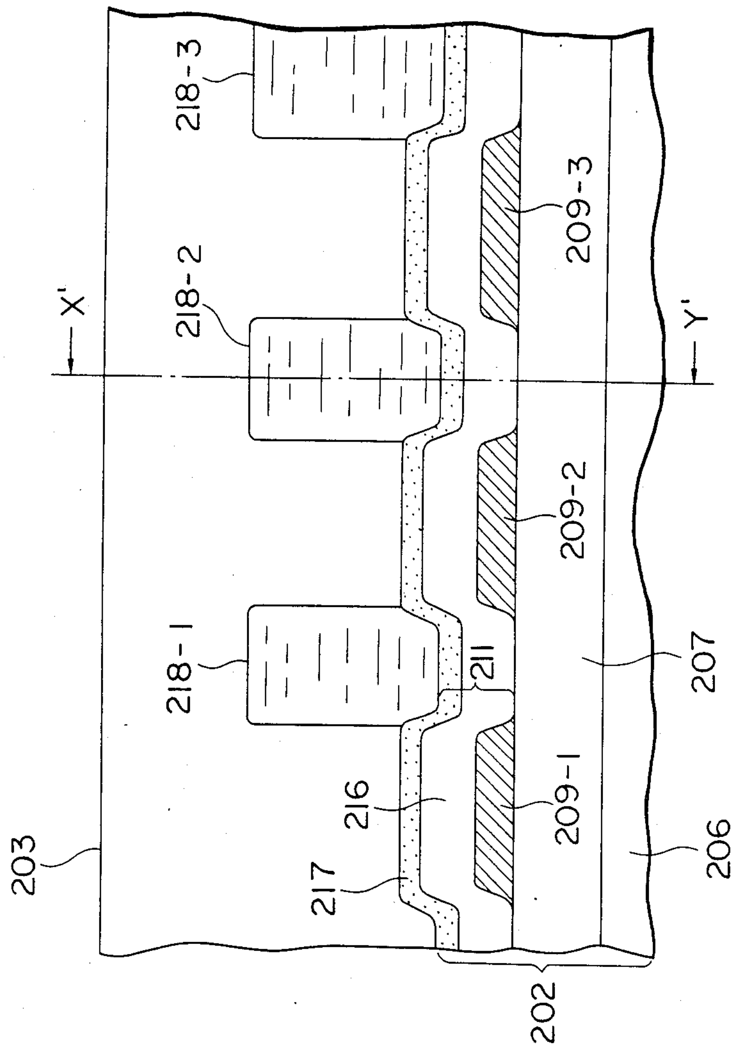
FIG. 6A is a schematic partial front view for illustration of another/recording head of the present invention, FIG. 6B a schematic partial sectional view taken along the dot and dash line X'Y', in FIG. 6A.
Figure 6B:
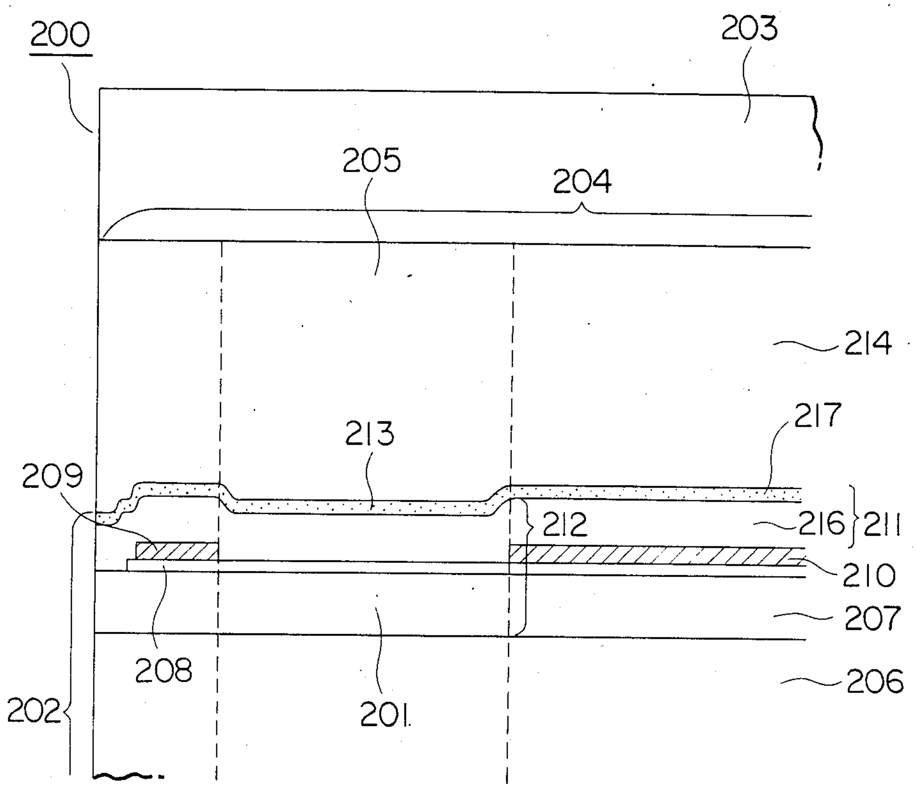

FIG. 6A shows a partial front view as viewed from the orifice side for illustraiton of the principal part of the structure of a preferred embodiment of the liquid jet recording head of the present invention and FIG. 6B shows a partial sectional view taken along the broken line X′Y′ in FIG. 6A, FIG. 6A corresponding to FIG. 1A and corresponding FIG. 6B to FIG. 1B.

The liquid jet recording head 200 shown in these figures is constituted as its principal part of a substrate 202 for liquid jet recording employing heat for liquid jetting on which a desired number of the electrothermal transducers are provided (hereinafter abbreviated as B/J) and a grooved plate 203 having a desired number of grooves provided corresponding to the above electrothermal transducer.

The B/J substrate 202 and the grooved plate 203 are junctioned to each other with adhesive, etc. at several positions to form the liquid channel 204 by the portion of the B/J substrate where the electrothermal transducer 201 is provided and the groove portion of the grooved plate 203, said liquid channel 204 having a heat-acting portion 205 as a part of its constitution. The B/J substrate 202 is provided with a substrate 206 constituted of silicon, glass, ceramics or metal, etc., a lower layer 207 of carbon or a material comprising carbon as the matrix on said substrate 206, a heat-generating resistance layer 208, electrodes 209 and 210 and the heat-generating layer 208 not covered with the electrodes on both sides of the surface of the heat-resisting layer 208, and a protective layer 211 constituted of an inorganic material so as to cover over the electrodes 209 and 210. The electrothermal transducer 201 has the heat-generating portion 212 as its principal part, said heat-generating portion 212 being constituted of the heat-generating resistance layer 208 and the upper layer 211 successively laminated on the substrate 206 from the side of the substrate 206, and the surface 213 (heat-acting surface) of the upper layer 211 is in direct contact with the liquid filling the liquid channcl 204.

In the case of the liquid jet recording head 200 shown in FIG. 6, the upper layer 211 is made of a double structure consisting of a layer 216 and a layer 217 for further enhancing the mechanical strength of said layer 211, the layer 216 being constituted of an inorganic material having excellent relative electrical insulation and heat ressistance such as inorganic oxides (e.g. $SiO_2$), inorganic nitrides (e.g. $Si_3N_4$), etc., the layer 217 being constituted of a metallic material which is tenacious, relatively excellent in mechanical strength and can be tightly contacted with and adhered to the layer 216, for example, Ta, etc. when the layer 216 is formed of $SiO_2$.

Thus, by constituting the surface layer of the first upper layer 211 of an inorganic material which is relatively tenacious and has mechanical strength, the shock on the heat acting surface 213 created by the cavitation action during liquid discharging can sufficiently be absorbed to result in the effect of prolonging the life of thc electrothermal transducer 201 to a great extent.

However, the layer 217 provided as the surface layer of the upper layer 211 is not necessarily required in the present invention.

The material constituting the first upper layer 211 may include, in addition to the inorganic materials as mentioned above, transition metal oxides such as titanium oxide, vanadium oxide, niobium oxide, molybdenum oxide, tantalum oxide, tungsten oxide, chronium oxide, zirconium oxide, hafnium oxide, lanthanum oxide, yttrium oxide, manganese oxide, etc. Further materials are metal oxides such as aluminum oxide, calcium oxide, strontium oxide, barium oxide, silicon oxide, etc. and complexes thereof, high resistance nitrides such as silicon nitride aluminum nitride, boron nitride, tantalum nitride, etc. and oxides thereof, complexes of nitride, and further thin film materials of amorphous silicon, amorphous selenium and other semiconductors, which may have lower resistance in their bulk forms, but can be made to have higher resistance in the production process such as by the sputtering method, the CVD method, the vapor deposition method, the gas phase reaction method, the liquid coating method, etc. The layer thickness is desirably made generally 0.1 μm to 5 μm, preferably 0.2 μm to 3 μm.

As the material constituting the heat-generating resistance layer 208, most materials which can generate heat as desired by passage of current may be employed.

Such materials may include specifically, for example, tantalum nitride, nickel-chromium nichrome, silver-palladium alloys, silicon semiconductors, or borides of metals such as hafnium, lanthanium, zirconium, titanium, tantalum, tungsten, molybdenum, niobium, chronium, vanadium, etc. as preferable ones.

Among the materials constituting the heat-generating layer 208, particularly preferred are metal borides, above all hafnium boride, followed by zirconium boride, lanthanum boride, tantalum boride, vanadium boride and niobium boride in the order mentioned.

The heat-generating resistance layer 208 can be formed using the materials as mentioned above according to the method of electron beam vapor deposition, sputtering, etc.

As the material constituting the electrodes 209 and 210, many electrode materials conventionally used can effectively be used, including specifically metals such as Al, Au, Ag, Pt, Cu, etc. Electrodes can be provided by use of these materials according to the method such as vapor deposition at predetermined positions to desired sizes, shapes and thicknesses. The lower layer 207 is provided as the layer for controlling the flow of heat generated primarily from the heat-generating portion 212 to the substrate side 206, and its layer thickness is designed so that the heat generated from the heat-generating portion 212 may flow in more quantity toward the heat-acting portion side 205 when the heat energy is permitted to act on the liquid in the heat-acting portion 205, or so that the heat remaining in the heat-generating portion 212 may flow rapidly toward the substrate side 206 when the current passage to the electrothermal transducer is turned off.

In the present invention, the lower layer 207 is constituted of carbon or a material comprising carbon as the matrix. More preferably, it is made of a layer containing 90 atomic % or more of carbon atoms. The lower layer 207 may preferably be a layer having characteristics similar to diamond, optimally a layer containing a thin film having a diamond structure or microcrystals having a diamond structure. Such a layer may be formed according to the CVD method, the plasma CVD method, the ionization vapor deposition method, the ion beam method, the sputtering method, etc. As the reactive gases, there may be employed gases containing carbon atoms, more preferably hydrocarbon gases as exemplified by $CH_4$ gas and $C_2H_6$ gas. Also, it is possible to use a gas mixture containing hydrogen gas in addition to the above gases. The pressure within the chamber during layer formation may differ depending on the layer formation method, but it may preferably be $10^{-2}$ to $10^{-3}$ Pa, more preferably $10^{-2}$ to $10^{2}$ Pa, and the temperature of the substrate may preferably be within the range of from room temperature to about 1000° C.

The layer thickness of the lower layer 207, which may differ depending on the thermal designing conditions, should preferably be 1 μm to 20 μm, more preferably 1 μm to 10 μm, most preferably 1 μm to 5 μm.

As the material constituting the constructive member of the common liquid chamber provided upstream of the grooved plate 203 and the heat acting portion 205, there may be employed effectively most of the materials which will not be affected thermally in shapes under the environment during working or use of the recording head, and can easily be applied with minute precise working simultaneously with easy realization of the surface precision as desired, and further can be worked so that the liquid may flow smoothly through the channels thus formed.

Figure 7A:
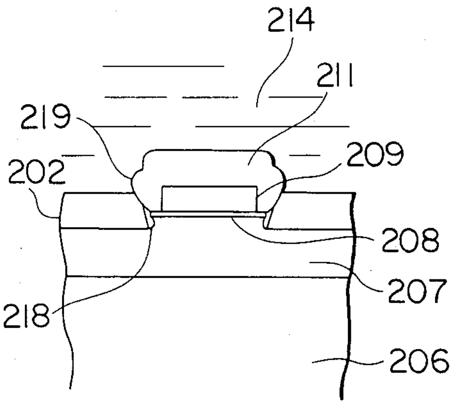
FIG. 7A is a schematic sectional view of the electrode portion of the recording head of the prior art, FIG. 7B a schematic sectional view of the electrode portion of the present invention.
Figure 7B:
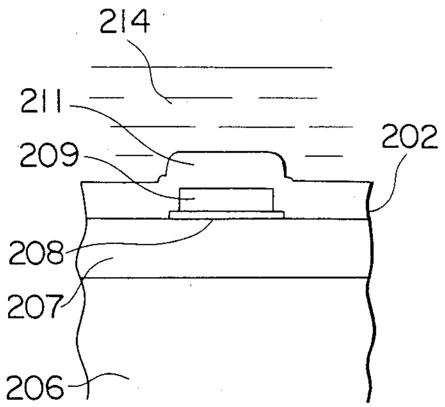

Next, by referring to FIG. 7A and FIG. 7B, explanation is made about the fact that the lower layer of carbon or a material comprising carbon as the matrix, more specifically a layer containing 90 atomic % or more of carbon atoms, having characteristics similar to diamond, which is formed on a substrate according to the CVD method, the plasma CVD method, the ionization vapor deposition method, etc., is required to have etching resistance. FIG. 7A is a schematic sectional view of the electrode portion of the electrothermal transducer of the recording head employing the lower layer of the prior art (e.g. $SiO_2$), and FIG. 7B a schematic sectional view of the electrode portion of the electrothermal transducer of the recording head according to the present invention.

In preparation of the recording head, the heat-resisting layer 208 provided on the lower layer 207 may generally be constituted of the materials as mentioned above, and these materials are excellent in etching resistance. For this reason, for patternization of the heat-generation resistance layer 208 to a desired shape, an etchant having high solubilizing ability such as a mixture of hydrofluoric acid and nitric acid may be employed. Accordingly, the lower layer 207 is also corroded in patternization of the heat-generating resistance layer 208, whereby the stepped difference 218 will be formed as shown in FIG. 7A. The stepped difference 218 may cause generation of the defective portion of bad step coverage as shown in FIG. 7A when forming the film of the upper layer 211 to be provided for protection of the electrode 209 and the heat-generating resistance layer 208. By the defective portion 219, the liquid filled is permeated through the upper layer 211 to undergo chemical reactions with the electrode 209 or the heat-generating resistance layer 208, thereby encroaching the electrode 209 and the heat-generating resistance layer 208. As the result, in the recording head of the prior art, wire breaking occurred in the conductive layer for the electrode and the heat-generating resistance layer, cracks developed from the defective portion 219 by the repeated thermal shock caused by heat generation of the heat-generating resistance layer 208, whereby the upper layer 211 was peeled off to lower markedly its life and reliability.

However, by making the lower layer a layer of a material comprising carbon or carbon as the main component, the lower layer is free from corrosion with an etchant even in etching of the heat-generating resistance layer 208, and therefore the stepped difference and the defective portion 219 formed during formation of the upper layer 211 will not be generated, whereby an ideal patternization may be effected as shown in FIG. 7B. This leads directly to high reliability and long life of the recording head.

In the prior art example, wherein $SiO_2$ is employed in the lower layer, in order to suppress the stepped difference 218 as small as possible, the substrate was immersed in an etching stopper substantially simultaneously with etching of the heat-generating resistance layer 208 to a desired shape. However, when such a treatment is performed, the pattern cannot be formed as desired due to the contamination on the substrate, the gas generated during etching, the resist residue, variance in film thickness or film properties of the heat-generating resistance layer, etc., whereby unnecessary portion may remain to give rise consequently to a problem of formation of short-circuit portion to lower the yield. By use of the lower layer of the present invention, the substrate can be immersed lengthly in an etchant even after the heat-generating resistance layer is substantially etched, and therefore lowering in yield due to the above problem can dramatically be reduced.

Figure 8:
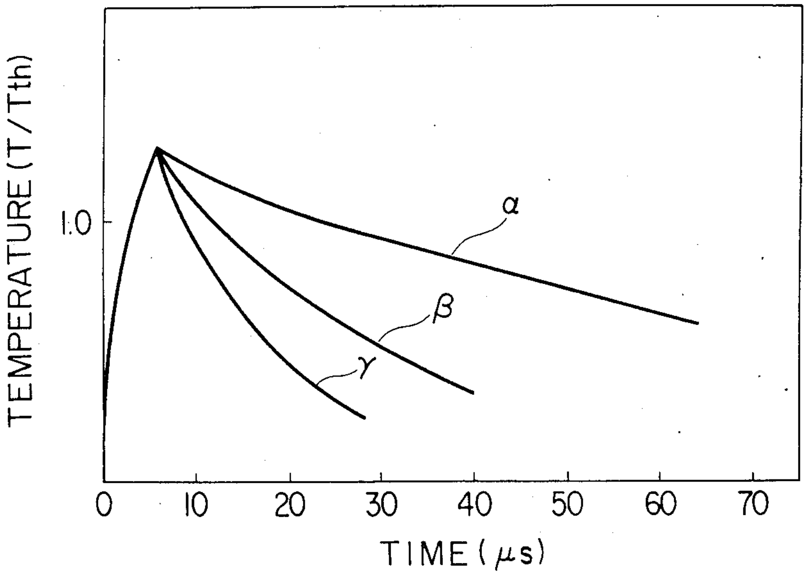
FIG. 8 shows the temperature change with time at the heat-acting surface and FIG. 9 shows the relationship between the driving frequency and the discharge initiation voltage.

FIG. 8 is an illustration of the thermal response of the B/J substrate 202, showing the change with time in temperature on the heat-acting surface for imparting the heat energy to the liquid. In FIG. 8, the axis of ordinate shows the value of the temperature on the heat-acting surface at the time t divided by the temperature Tth at which foaming of liquid begins on the heat-acting surface. Usually, Tth is within the range of from 150° to 250° C. The axis of abscissa is the time after the time when the pulse signal is applied is determined as 0. The curve $\alpha$ is the heat wave form when an alumina substrate is used as the substrate, the lower layer 207 is made a glaze layer (40 $\mu$m) and a pulse of 6 $\mu$s is given. The curve $\beta$ is the heat wave form when the substrate is Si, the lower layer is $SiO_2$ thermally oxidized (5 $\mu$m) and the same pulse as mentioned above is applied. Further, $\gamma$ shows the heat wave form when the substrate is Si and the lower layer (5 $\mu$m) of the present invention is employed. From the results as represented in the graph, dissipation of heat can be improved to a great extent as compared with the prior art by changing the lower layer $SiO_2$ or the like with about 0.002 cal/sec.cm. °C. to the lower layer of the present invention with about 1.0 cal/sec.cm. °C., whereby it is rendered possible to provide a recording head excellent in heat response. For this reason, even when a high speed driving may be performed, no heat accumulation of the substrate will occur, thus enabling recording at a constant level of applied voltage.

Figure 9:
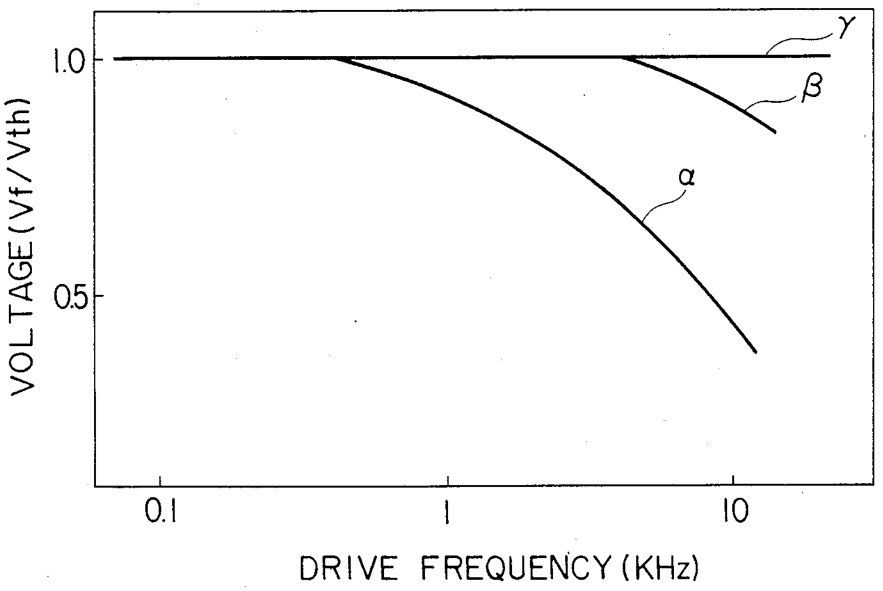

For example, in the case of the recording head of $\alpha$ as mentioned above, at a driving frequency of about 1.5 KHz or higher, there has been involved the problem that the dot size is changed to lower the quality of printed letters. Also, in the case of the above recording head of $\beta$, the same problem has been involved at 10 KHz or higher. Whereas, in the recording head of the present invention, recording was found to be fairly possible at 20 KHz or higher. FIG. 9 is an illustration for explaining about the above effect, showing the relationship between the driving frequency and the discharging initiating voltage. The axis of ordinate indicates the value of the discharging initiating voltage Vth (the voltage measured in the region where the liquid foaming initiating voltage will be changed due to the heat accumulating effect of the substrate when the frequency is varied) divided by the discharging initiating voltage Vth on the low frequency side (the voltage measured in the region where there is no change in discharging initiating voltage even when the frequency may be varied). From this, it can be shown that, in the recording head of the present invention of high heat dissipation, no heat accumulation occurs even up to a high frequency and stable recording is possible at a constant level of the discharging initiating voltage.

This means that a liquid jet recording head capable of high speed recording and a multi-tone recording can be provided.

Also, the lower layer to be used in the present invention has other physical properties which are by far desirable as compared with $SiO_2$ of the prior art.

The lower layer to be used in the present invention has a coefficient of thermal expansion of about $1\times10^{-6}$ to $5\times10^{-6}$/°C., which is very small in difference from the coefficient of thermal expansion of Si preferably employed as the substrate (a coefficient of thermal expansion of about $2.5\times10^{-6}$ to $3\times10^{-6}$/°C.) or that of $HfB_2$ preferably employed as the heat-generating resistance layer (a coefficient of thermal expansion of about $7.6\times10^{-6}$) (the coefficient of thermal expansion of $SiO_2$ being about $3.5\times10^{-7}$ to $5.5\times10^{-7}$), is free from generation of peel-off or swelling and can give a recording head having high reliability.

The lower layer may be provided on the entire upper surface of the substrate, but it will only suffice to provide the lower layer at least beneath the heat-generating portion of the electrothermal transducer in order to accomplish improvement of high speed response of the recording head.

As for the upper layer, although an example of two-layer constitution was shown in FIG. 6A and FIG. 6B, there is no problem in one-layer constitution, provided that the object of the upper layer can be accomplished. Such upper layer is not necessarily required, if there is no such trouble as occurrence of chemical reaction of the substrate, the conductive layer or the heat-generating resistance layer with the liquid (ink). Further, the upper layer may be constituted of 3 or more layers, provided that the heat energy can effectively be transmitted to the liquid. As an example when the upper layer is constituted of three layers, $SiO_2$ layer, Ta layer and an organic resin layer may be laminated successively from the substrate side. In this case, the organic resin layer is provided for improvement of ink resistance.

As described in detail above, no heat accumulation occurs in the lower layer according to the present invention even when continuously used repeatedly to enhance heat dissipating characteristic, whereby a recording head suitable for high speed recording and multi-tone recording can be provided.

Also, the lower layer of the present invention has high etching resistance and therefore the yield in the production steps can be increased, and a recording head having high reliability can be provided.

In addition, according to the present invention, since the lower layer has a coefficient of thermal expansion which is approximate to the coefficient of thermal expansion of other materials in contact with said layer, there can be provided a recording head of high durability and high life which can stand sufficiently the thermal stress applied repeatedly by the thermal action accompanied with recording actuation.

In the present invention, a lower layer made of carbon or a material comprising carbon as the main component is used, and its material has more excellent thermal characteristics such as heat resistance, thermal conductivity, coefficient of thermal expansion, etc., than the materials conventionally used for the lower layer in the prior art, and therefore a recording head by far superior in its thermal characteristics as compared with the recording head of the prior art can be provided.

It is also possible to provide a recording head enriched in reliability, excellent in high speed response and excellent in durability with long life. In addition, according to the present invention, recording heads with excellent production yield can also be provided.

The present invention is described below by referring to the following Examples.

EXAMPLE 1

The thermal head prepared as the recording head of the present invention is described as an Example. In this Example, the heat-generating resistance layer was formed by use of the plasma CVD method.

First, after a substrate of alumina ceramics of 4 cm×3 cm was cleaned and placed in a chamber which can be brought into reduced pressure, the chamber was evacuated to vacuum. Then, as the starting gases, $CH_4$ and hydrogen gas were introduced into the chamber and high frequency voltage (RF power 3 Kw) was applied between the electrodes while maintaining the perssure in the chamber at $10^{-2}$ to $10^3$ Pa to excite discharging and form a plasma atmosphere, thereby forming a diamond-like carbon film as the lower layer to a thickness of 10 μm on the substrate.

As the next step, on the above carbon film, $HfB_2$ was formed as the heat-generating resistance layer to a thickness of 2000 Å by RF sputtering, followed by formation of Al as the electrodes to a thickness of 1 μm according to the EB vapor deposition method.

Then, by use of the photolithographic step, Al was etched to a desired shape to form electrodes for constituting the electrothermal transducer. Subsequently, by use of the photolithographic step, the electrothermal transducer was formed by removing the heat-generating resistance layer at unnecessary portions with a HF type etchant. In this Example, the electrothermal transducer was prepared to have its heat-generating portion, namely the heat-generating resistance layer portion sandwitched between a pair of opposed electrodes, with a size of 100 μm×100 μm, its pitch being made 8/mm. And, its resistance value was 80 ohm.

On the electrothermal transducer formed as described above, $SiO_2$ was formed by sputtering as the protective film to a thickness of 2 μm, followed by sputtering continuously $Ta_2O_5$ on $SiO_2$ to a thickness of 3 μm to prepare a recording head.

As Comparative Examples, samples of recording heads were prepared in the same manner as in this Example except for replacing the lower layer in this Example with $SiO_2$ prepared by sputtering and with glaze layer prepared by spin coating on the substrate, followed by calcination.

The recording heads as described above were drived by inputting electrical pulse signals at 0.5 KHz, 1.0 KHz and 1.5 KHz with the duty of the electrical pulse signal being 50%. The results are shown in Table 1. In Table 1, the mark O indicates the state wherein 90% or more of the recorded dots were printed uniformly, the mark Δ the state wherein 70% or more of the recorded dots were printed uniformly, and the mark X the state wherein 50% or more of the recorded dots suffered from lacking, blurring or change in dot size during recording.

TABLE 1

| | Driving frequency | | |
|---|---|---|---|
| Lower layer | 0.5 KHz | 1.0 KHz | 1.5 KHz |
| Example | O | O | O |
| Glaze layer | O | Δ | X |
| $SiO_2$ | O | O | Δ |

In this Example, since a diamond-like carbon film is used as the lower layer, the thermal characteristics are very excellent as compared with the recording head of the prior art. Accordingly, as shown in Table 1, the quality of the printed letter is by far superior in this Example as compared with the prior art, particularly exhibiting marked difference in quality of the high speed printed letters. Also, the recording head in this Example is not only a high speed response type thermal recording head, but it is also endowed with high reliability, being by far superior in life as compared with the recording heads of the prior art.

As another example of the present invention, a recording head was prepared, employing the diamondlike carbon film used in the lower layer for the abrasion resistant layer, as different from the above Example in which the abrasion resistant layer as one of the protective layers was formed by use of $Ta_2O_5$. Also, in the case of this Example, a recording head very excellent in high speed response could be obtained, and the recording head obtained was further elongated in life due to similarlity in various characteristics of the abrasion resistant layer to those required for the abrasion resistant layer.

EXAMPLE 2

In the following, the recording head using the lower layer of the present invention to be employed for the liquid jet method is to be described.

First, after a 4 inch wafer Si substrate was cleaned and placed in a chamber which could be reduced in pressure. Then, the chamber was evacuated to vacuum, and as the starting gases, $CH_4$ and hydrogen gas were introduced into the chamber and high frequency voltage (RF power 3 Kw) was applied between the electrodes while maintaining the pressure in the chamber at $10^{-2}$ to $10^3$ Pa to excite discharging and form a plasma atmosphere, thereby forming a diamond-like carbon film as the lower layer to a thickness of 5 μm on the substrate.

As the next step, on the above carbon film, $HfB_2$ was formed as the heat-generating resistance layer to a thickness of 2000 Å by RF sputtering, followed by formation of A1 as the electrodes to a thickness of 1 μm according to the EB vapor deposition method.

Then, by use of the photolithographic step, the electroconductive layer (A1) was etched to a desired shape to form electrodes for constituting the electrothermal transducer. Subsequently, by use of the photolithographic step, the electrothermal transducer was formed by removing the heat-generating resistance layer at unnecessary portions with a HF type etchant.

In this Example, the electrothermal transducer was prepared to have its heat-generating portion, namely the heat-generating resistance layer portion sandwitched between a pair of opposed electrodes, with a size of 100 μm×100 μm, its pitch being made 8/mm. And, its resistance value was 80 ohm.

On the electrothermal transducer formed as described above, $SiO_2$ layer was formed by sputtering to a thickness of 1.9 μm, followed by sputtering successively of Ta on $SiO_2$ to a thickness of 0.5 μm to form a protective layer (upper layer), thus preparing a B/J substrate.

After a photosensitive resin was laminated on the B/J substrate, the photosensitive resin was exposed to light according to a desired pattern and developed to form the wall surface of the liquid channel and the liquid chamber. Further. on the cured film of the above photosensitive resin formed with a desired pattern, glass plates were junctioned with two openings of 1 mϕ as the ink feeding inlets so that the ink feeding inlets may come into the liquid chamber portion. Subsequently, the orifice end face was polished so that the distance between the tip of the heat-generating resistance member and the orifice may be 300 μm to prepare a recording head.

While supplying an ink comprising a black dye and ethanol as the main components to the heat-acting portion with a back pressure of 0.01 atm., rectangular voltage pulse printed letter signals were applied on the electrothermal transcuder to record images, which were then evaluated.

As the result, even in recording actuation over a long time, discharging of droplets was never discontinued, and also there was substantially no difference observed in dot diameter recorded by input of high frequency electrical pulse signals, thus enabling stable recording from the beginning to the end.

In addition, even when recording was performed over a long time while inputting high frequency electrical pulse signals, recording could be stably done from the beginning to the end.

Further, the test of applying thermal impact was repeated while leaving the recording head in atmospheres of −30° C. and 60° C. with the ink being filled in the recording head. As the result, even under the conditions where the conventional recording head using $SiO_2$ as the lower layer may be encountered with inconveniences, the Example of the present invention is entirely encountered with inconvenience caused by the B/J substrate.

I claim:

1. A recording head which comprises at least a substrate, a lower layer provided on said substrate, a heat-generating resistance layer provided on said lower layer and at least a pair of opposed electrodes connected electrically to said heat-generating resistance layer, wherein said lower layer is a layer containing a thin carbon film having a diamond structure or fine carbon crystals having a diamond structure.

2. A recording head according to claim 1, wherein said lower layer contains 90 atomic % or more of carbon atoms.

3. A recording head according to claim 1, wherein said substrate is selected from the group consisting of silicon, ceramics, glass and metal.

4. A recording head according to claim 1, wherein said lower layer has a thickness of 1 μm to 50 μm.

5. A recording head according to claim 1, wherein said recording head has a protective layer.

6. A recording head according to claim 5, wherein said protective layer comprises a carbon film having a diamond structure.

7. A recording head according to claim 1, wherein said lower layer is provided on said substrate between the said at least one pair of opposed electrodes.

8. A liquid jet recording head which comprises a liquid discharging section having an orifice for discharging liquid to form flying droplets and a heat acting section where heat energy for formation of said droplets acts on the liquid, and an electrothermal transducer having a lower layer provided on a substrate, a heat-generating resistance layer provided on said lower layer and at least one pair of opposed electrodes connected electrically to the heat-generating resistance layer to form a heat-generating section between these electrodes, wherein said lower layer is a layer containing a thin carbon film having a diamond structure of fine carbon crystals having a diamond structure.

9. A liquid jet recording head according to claim 8, wherein said lower layer contains 90 atomic % or more of carbon atoms.

10. A liquid jet recording head according to claim 8, wherein said substrate is selected from a group consisting of silicon, glass, ceramics and metal.

11. A liquid jet recording head according to claim 8, wherein said lower layer has a thickness of 1 μm to 20 μm.

12. A liquid jet recording head according to claim 8, wherein said electrothermal transducer has an upper layer.

13. A liquid jet recording head according to claim 12, wherein said upper layer consists of two layers.

14. A liquid jet recording head according to claim 12, wherein said upper layer comprises an insulating material.

15. A liquid jet recording head according to claim 14, wherein said insulating material comprises an inorganic material.

16. A liquid jet recording head according to claim 8, wherein said lower layer is provided at least in said heat-generating section.

* * * * *